United States Patent [19]

Weichselgärtner et al.

[11] 4,167,959
[45] Sep. 18, 1979

[54] APPARATUS FOR PRODUCING PLUTONIUM FUEL RODS FOR NUCLEAR POWER PLANTS

[75] Inventors: Horst Weichselgärtner, Hanau; Manfred Koether, Frankfurt am Main, both of Fed. Rep. of Germany

[73] Assignee: Alkem GmbH, Hanau, Fed. Rep. of Germany

[21] Appl. No.: 802,551

[22] Filed: Jun. 1, 1977

[30] Foreign Application Priority Data

Jun. 3, 1976 [DE] Fed. Rep. of Germany ....... 2624997

[51] Int. Cl.² .................... B65B 1/00; G21C 19/00
[52] U.S. Cl. ................... 141/392; 128/1 R; 176/30
[58] Field of Search ............ 128/1 R, 1 B, 298; 141/392; 176/30–32; 312/1

[56] References Cited

U.S. PATENT DOCUMENTS

| | | | |
|---|---|---|---|
| 2,516,419 | 7/1950 | Reyniers | 128/1 R |
| 3,428,523 | 2/1969 | MacKay | 176/32 |
| 3,958,699 | 5/1976 | Medlin | 176/32 X |

*Primary Examiner*—Richard E. Aegerter
*Assistant Examiner*—Frederick R. Schmidt
*Attorney, Agent, or Firm*—Herbert L. Lerner

[57] ABSTRACT

Apparatus for producing plutonium fuel rods includes a glove box wherein jacket tubes are filled with fuel and closed at the ends thereof, said glove box having a side thereof formed with a substantially cylindrical opening, a disc formed with bores for introducing the jacket tubes therein being received in the cylindrical opening, a respective sluice for an end of a jacket tube disposed in front of each of the introducing bores, each of the sluices including a stopcock, a seal engageable with a jacket tube at the outside thereof, and a tube section extending from the seal to the stopcock, the sluices having respective central axes distributed about the periphery of a circle having a center coinciding with the central axis of the cylindrical opening formed in the side of the glove box.

2 Claims, 3 Drawing Figures

APPARATUS FOR PRODUCING PLUTONIUM FUEL RODS FOR NUCLEAR POWER PLANTS

The invention relates to apparatus for producing plutonium fuel rods for nuclear power plants.

During the burn-off of fuel rods in nuclear power plants, plutonium is formed as a fission product amongst others. The plutonium is able to be reconverted to nuclear fuel in a conversion and processing plant. Since plutonium emits alpha radiation of relatively long half-life and is extremely toxic, the processing or handling of this material must take place within closed boxes, so-called glove boxes having an atmosphere that is gas-tightly closed off from the ambient atmosphere.

When the pellets provided for nuclear fuel rods are compressed and fully sintered, to complete the manufacture of the fuel rods, fuel-rod jacket tubes must be filled with the pellets and gas-tightly closed. For this purpose, essentially three working processes or operation cycles are required: filling the pellets into a jacket tube closed at one end thereof, forcing the stopper or plug into the open end of the jacket tube, and welding shut that open end of the jacket tube.

It is accordingly an object of the invention to provide apparatus for producing plutonium fuel rods wherein the foregoing working process may be carried out without requiring the jacket tubes necessary for producing the fuel rods to be completely sluiced into a glove box and, after having been filled with the plutonium pellets, to be completely sluiced out of the glove box again.

With the foregoing and other objects in view, there is provided, in accordance with the invention, apparatus for producing plutonium fuel rods comprising a glove box wherein jacket tubes are filled with fuel and closed at the ends thereof, the glove box having a side thereof formed with a substantially cylindrical opening, a disc formed with bores for introducing the jacket tubes therein being received in the cylindrical opening, a respective sluice for an end of a jacket tube disposed in front of each of the introducing bores, each of the sluices comprising a stopcock, a seal engageable with a jacket tube at the outside thereof, and a tube section extending from the seal to the stopcock, the sluices having respective central axes distributed about the periphery of a circle having a center coinciding with the central axis of the cylindrical opening formed in the side of the glove box.

In accordance with another feature of the invention, the glove box is formed with a processing chamber and an antechamber separated from one another, the antechamber adjoining the side of the glove box formed with the cylindrical opening, the processing chamber having an inner pressure lower than ambient atmospheric pressure, and the antechamber having an inner pressure with an adjusted value between that of the inner pressure of the processing chamber and that of the ambient atmospheric pressure.

Other features which are considered as characteristic for the invention are set forth in the appended claims.

Although the invention is illustrated and described herein as embodied in apparatus for producing plutonium fuel rods for nuclear power plants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
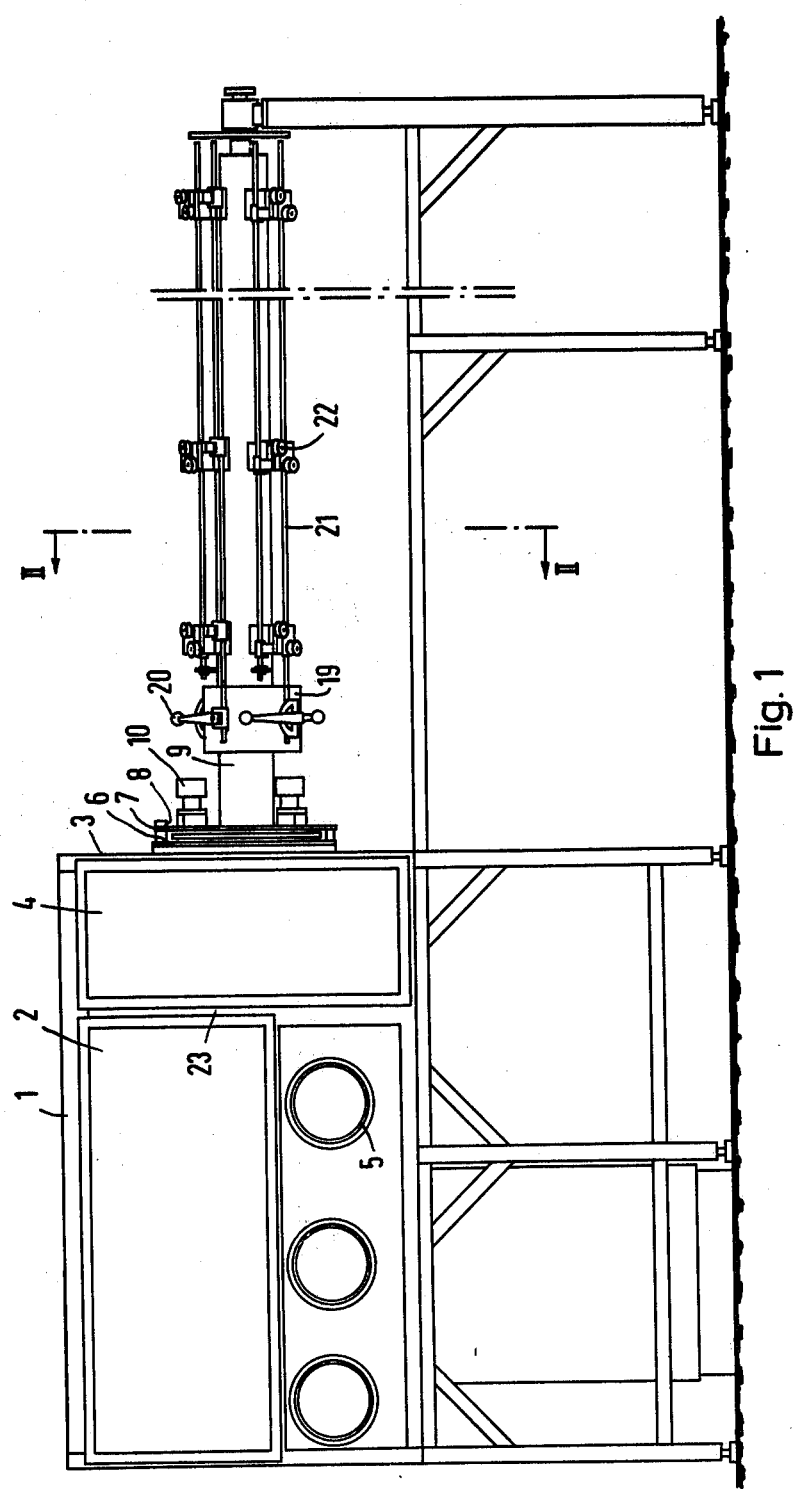
FIG. 1 is a side elevational view of the apparatus for producing plutonium fuel rods for nuclear power plants in accordance with the invention.
Figure 2:
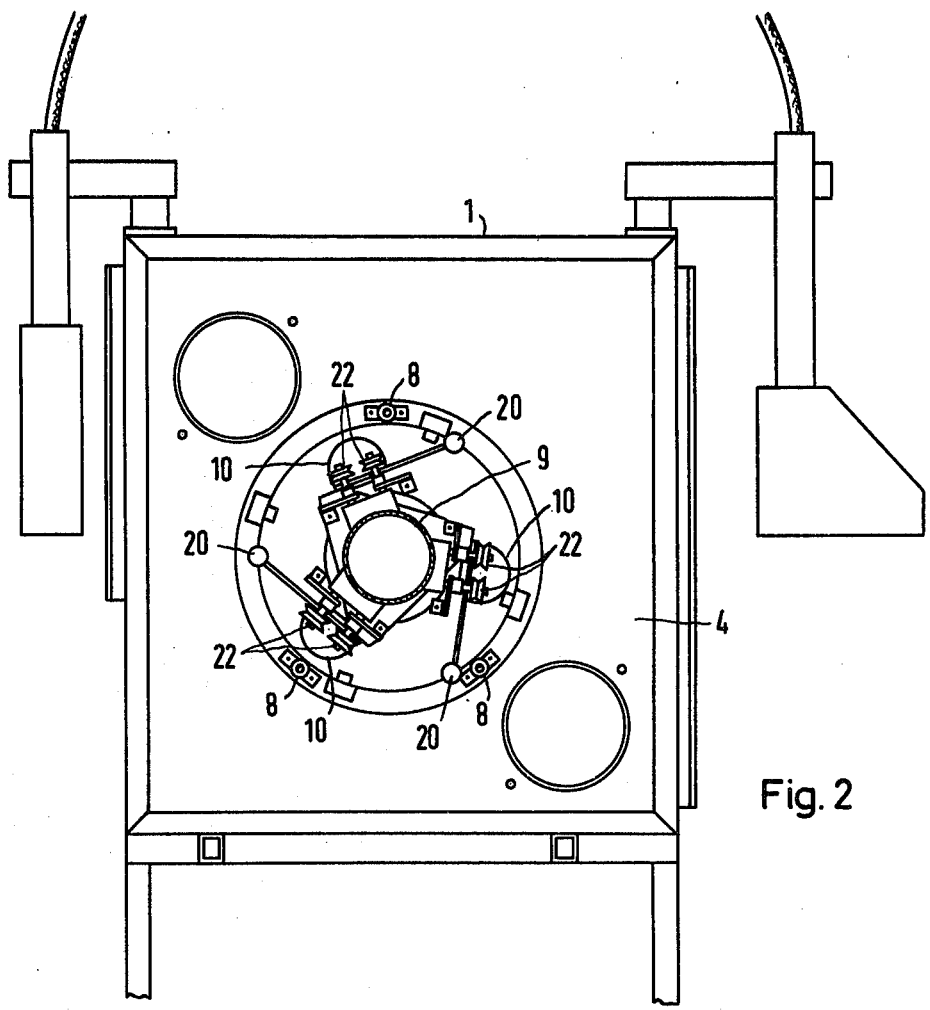
FIG. 2 is an enlarged cross-sectional view of FIG. 1 taken along the line II—II in direction of the arrows.

Referring now to the drawing and first, particularly, to FIG. 1 thereof, there is shown a glove box 1 wherein at least one processing or treatment chamber 2 and one antechamber 4 adjoining the front side 3 of the glove box located at the right-hand side thereof in FIG. 1 are located. The processing chamber 2 is formed with openings 5 that are closed with gloves so that an operator can handle or manipulate equipment or other objects within the glove box 1 without breaking the gas-tight closure thereof from the outside. In the front side 3 of the glove box 1, a further opening 6 is provided which is closed by a disc 7. The disc 7 is held in the opening 6 by means of bearings 8 and mounted in front of this opening 6.

Figure 3:
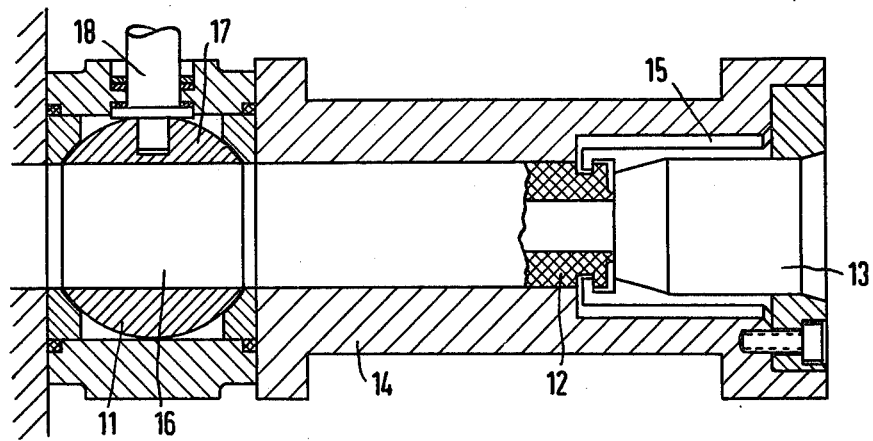
FIG. 3 is a much-enlarged fragmentary sectional view of FIG. 1 showing a sluice or lock employed for sealing the jacket tubes of the fuel rods.

Insert openings are provided offset at a mutually equal spacing from the middle shaft 9 of the opening 6. In front of the insert openings, sluices or locks 10 are mounted which, as shown in FIG. 3, are formed, respectively, of a stopcock 11, a seal 12, an introduction opening 13 for ends of the jacket tube as well as a tube section 14 extending from the introduction opening 13 to the stopcock 11. The seal 12 is retained at a holding device 15 in the tube section 14. The diameter of the tube section 14 is determined by the outer diameter of the jacket tube that is to be filled. Advantageously employed as the stopcock 11 is a ballcock having a spherical member 17 formed with a cylindrical bore 16 and mounted for rotation about a shaft 18. A clamping device 19 having actuating levers 20 serves for clamping, directing or guiding and holding the jacket tube. The actuating levers 20 are connected by means of actuating rods 21 to rollers 22 which are disposed pairwise adjacent one another. The rollers 22, by actuating the actuating levers 20, by means of the actuating rods 21, can be moved apart from one another so that it is possible to insert the jacket tube from the side and take it out again when it is filled. The antechamber 4 of the glove box 1 possesses a negative pressure with respect to the outside but which is however more positive than is the negative pressure in the processing chamber 2. Due to this construction, the possibility of contamination of the outside of the jacket tube is reduced. The antechamber 4 is separated from the processing chamber or chambers 2 by a partition 23 provided with openings. In order to be able to effect a change of position by turning the disc 7 the jacket tubes must be retracted beforehand into the antechamber 4. Only parts of the jacket tube that were previously in the antechamber 4 and had not been present, however, in any of the processing chambers 2 are exposed to the outside so that also during the change of position no contamination danger exists for the environment.

After new jacket tubes are inserted between the rollers 22, an end of the jacket tube is passed or guided through the sluices or locks 10 and the antechamber 4 into the processing chamber 2. After the completion of a processing sequence, the disc 7 is turned so that, simultaneously, the first processing stage (filling the jacket tube) for the second jacket tube, and the second processing stage (forcing in the stopper or plug) for the initially filled jacket tube can be effected. During continuous production, a finished jacket tube must be removed and replaced by a new one then only in one position after every turn or swing of the disc 7.

What is claimed is:

1. Apparatus for producing plutonium fuel rods comprising a glove box wherein jacket tubes are filled with fuel and closed at the ends thereof, said glove box having a side thereof formed with a substantially cylindrical opening, a disc formed with bores for introducing the jacket tubes therein being received in said cylindrical opening, a respective sluice for an end of a jacket tube disposed in front of each of said introducing bores, each of the sluices comprising a stopcock sealing means for engaging at all times with a jacket tube at the outside thereon while the jacket tube is being filled with fuel and closed at an end thereof, and a tube section extending from said sealing means to said stopcock, said sluices having respective central axes distributed about the periphery of a circle having a center coinciding with the central axis of the cylindrical opening formed in said side of said glove box; each of said respective sluice sealing means constructed so as to allow the introduction and removal of said jacket tubes and coacting with said jacket tubes to prevent contamination of the atmosphere.

2. Apparatus according to claim 1 wherein said glove box is formed with a processing chamber and an antechamber separated from one another, said antechamber adjoining said side of said glove box formed with said cylindrical opening, said means for maintaining said processing chamber at an inner pressure lower than ambient atmospheric pressure and for maintaining said antechamber at an inner pressure with an adjusted value between that of the inner pressure of said processing chamber and that of the ambient atmospheric pressure.

* * * * *